(12) United States Patent
Cahouet et al.

(10) Patent No.: US 11,948,699 B2
(45) Date of Patent: Apr. 2, 2024

(54) NUCLEAR REACTOR, METHODS FOR ASSEMBLING AND REPLACING THERMOCOUPLE DUCTS, ASSEMBLY FOR IMPLEMENTING THESE METHODS

(71) Applicant: FRAMATOME, Courbevoie (FR)

(72) Inventors: Laurent Cahouet, Chaudenay (FR); Bruno Magain, Montret (FR); Alain Scalvini, Ouroux sur Saone (FR)

(73) Assignee: FRAMATOME, Courbevoie (FR)

( * ) Notice: Subject to any disclaimer, the term of this patent is extended or adjusted under 35 U.S.C. 154(b) by 288 days.

(21) Appl. No.: 16/313,868

(22) PCT Filed: Jun. 26, 2017

(86) PCT No.: PCT/EP2017/065687
§ 371 (c)(1),
(2) Date: Dec. 27, 2018

(87) PCT Pub. No.: WO2018/001950
PCT Pub. Date: Jan. 4, 2018

(65) Prior Publication Data
US 2019/0326027 A1   Oct. 24, 2019

(30) Foreign Application Priority Data

Jun. 29, 2016 (FR) ..................... 16 56122

(51) Int. Cl.
*G21C 17/112* (2006.01)
*G21C 5/02* (2006.01)
*G21C 19/20* (2006.01)

(52) U.S. Cl.
CPC .............. *G21C 17/112* (2013.01); *G21C 5/02* (2013.01); *G21C 19/207* (2013.01)

(58) Field of Classification Search
CPC .... G21C 17/112; G21C 17/10; G21C 17/102; G21C 13/036; G21C 17/116; F16L 3/2235
USPC .......................................... 374/208; 376/247
See application file for complete search history.

(56) References Cited

U.S. PATENT DOCUMENTS

| 3,827,935 A | * | 8/1974 | Grüner | ................... F16L 15/008 376/245 |
| 3,930,938 A | * | 1/1976 | Berglund | ............... G21C 7/117 376/224 |
| 4,142,937 A | * | 3/1979 | Eyral | ................... G21C 17/116 376/203 |

(Continued)

FOREIGN PATENT DOCUMENTS

| FR | 2883096 A1 | * | 9/2006 | ........... G21C 19/207 |
| FR | 3007811 A1 | * | 1/2015 | ........... G21C 17/112 |

OTHER PUBLICATIONS

Corresponding Search Report PCT/EP2017/065687.

*Primary Examiner* — Jack W Keith
*Assistant Examiner* — Jinney Kil
(74) *Attorney, Agent, or Firm* — Davidson, Davidson & Kappel, LLC (57) ABSTRACT

A nuclear reactor includes a vessel (1), a support plate (8), arranged in the vessel (1) above the core (2); a plurality of separate dispensing ducts (21); and support members (33) provided to keep the thermocouple ducts (21) in position. Each support member (33) includes a foot (35) rigidly attached to the support plate (8), a head (37) to which the or each thermocouple duct (21) is attached, and a detachable connection (39) from the head (37) to the foot (35).

19 Claims, 6 Drawing Sheets (56) References Cited

U.S. PATENT DOCUMENTS

| | | | | |
|---|---|---|---|---|
| 4,765,947 | A * | 8/1988 | Babin | G21C 17/116 376/347 |
| 4,802,379 | A * | 2/1989 | Edajima | G21C 17/116 226/110 |
| 4,830,515 | A * | 5/1989 | Cortes | G01K 1/14 136/221 |
| 4,833,329 | A * | 5/1989 | Quint | G21G 4/08 137/573 |
| 5,057,270 | A * | 10/1991 | Chevereau | G21C 19/02 376/254 |
| 5,243,800 | A * | 9/1993 | Olbrich | E04F 17/08 52/220.1 |
| 5,828,711 | A * | 10/1998 | Malmasson | G21C 13/036 376/204 |
| 8,121,243 | B2 * | 2/2012 | Yonemoto | G21C 19/02 376/254 |
| 9,082,519 | B2 * | 7/2015 | Weisel | G21C 13/02 |
| 2007/0201606 | A1 * | 8/2007 | Ishii | G21C 17/112 376/371 |
| 2010/0002825 | A1 * | 1/2010 | Buchot | G21C 17/112 376/260 |
| 2012/0213320 | A1 | 8/2012 | Lange et al. | |
| 2013/0177122 | A1 * | 7/2013 | Fushimi | G21C 17/035 376/247 |
| 2013/0221662 | A1 * | 8/2013 | Cahouet | F16L 19/005 285/124.2 |
| 2013/0336439 | A1 * | 12/2013 | Isono | G21C 19/20 376/254 |
| 2016/0180978 | A1 * | 6/2016 | Parize | G21C 21/00 376/247 |
| 2018/0133852 | A1 * | 5/2018 | Cahouet | B23P 19/022 |
| 2019/0341159 | A1 * | 11/2019 | Gaulupeau | G21C 19/02 |

* cited by examiner

NUCLEAR REACTOR, METHODS FOR ASSEMBLING AND REPLACING THERMOCOUPLE DUCTS, ASSEMBLY FOR IMPLEMENTING THESE METHODS

The present invention generally relates to the assembly of thermocouple ducts in a nuclear reactor.

More specifically, the invention relates to:

a vessel;

nuclear fuel assemblies forming a core arranged in the vessel;

a support plate, arranged in the vessel above the core;

a plurality of thermocouple ducts arranged in the vessel and passing through the support plate through dedicated orifices;

support members provided to keep the thermocouple ducts in position, each support member being rigidly attached to the support plate, at least one thermocouple duct being attached to each support plate.

BACKGROUND

Pressurized water nuclear reactors include, inside a vessel, the core of the nuclear reactor made up of prismatic fuel assemblies with their vertical axis and, above the core, upper inner equipment in particular including a set of vertical guide-tubes making it possible to guide control bars made up of bundles of rods placed parallel to one another and containing a material absorbing neutrons.

To control reactors by adjusting the reactivity of the core, the absorbent rod clusters are moved vertically, during the operation of the reactor, such that the absorbent rods are introduced over a greater or lesser height within some fuel assemblies of the core.

The upper inner equipment generally includes an upper plate, also called support plate, and a lower plate making up the upper plate of the core of the nuclear reactor, bearing on the upper end of the fuel assemblies when the inner upper equipment is in the usage position in the core of the reactor. The vertical guide tubes guiding the control rods are connected to the support plate and the lower plate. They each include a first part interleaved between the support plate and the lower plate and a second part fixed above said support plate. Spacer columns arranged between the support plate and the lower plate, parallel to the guide tubes, make it possible to maintain said plates and provide the rigidity of the upper inner equipment.

The upper inner equipment also comprises instrumentation columns, such as cylindrical thermocouple columns. In each of the thermocouple columns, a thermocouple assembly is positioned making it possible to measure the temperature of the coolant at the outlet of a preselected set of fuel assemblies of the core of the reactor.

There are generally two or four thermocouple columns.

Each thermocouple column is not fixed on the support plate of the upper inner equipment, but is guided by a spindle extending vertically above said plate and which penetrates the thermocouple column. However, each thermocouple column is secured to the cover of the vessel of the reactor only by upper sealing means, positioned between a tubing of an adapter fixed in an opening of the cover and the upper part of the column.

Several thermocouples are therefore positioned in a column and leave said column through peripheral openings, arranged at the base of the column in order each to join a branch passing through the support plate. To that end, each branch is provided with a guide tube positioned aligned with an orifice arranged in the support plate, substantially overhanging a zone where the temperature measurement must be done. The thermocouple is inserted into an upper guide duct supported by the thermocouple column and by a lower guide duct positioned in the tube of the corresponding branch. The sensitive measuring end of the thermocouple is positioned at the predetermined measuring zone.

Some of the thermocouples are intended to measure the temperature of the coolant of the reactor, at the outlet of the core, below the upper plate of the core, near the upper end-piece of the fuel assemblies.

The thermocouples inserted into the ducts are subjected to high temperature and pressure stresses, such that some of them may have operating defects after a certain residence time in the vessel of the reactor.

It is then no longer possible to have a reliable and representative picture of the actual temperature of the coolant of the reactor core.

It is therefore necessary to replace these thermocouples and/or these ducts during scheduled upkeep operations of the nuclear reactor.

These ducts are replaced after the reactor has been stopped and cooled and after the cover has been disassembled.

In the current reactors, the thermocouple ducts are welded on the support members, the latter being screwed to the support plate.

SUMMARY OF THE INVENTION

The disassembly of the thermocouple ducts causes the irreversible damage of the support members. It is necessary to machine the support members to eliminate the welds. The placement of new thermocouple ducts is also tedious, since it requires welding operations in a highly radiant environment.

In this context, an assembly is provided making it possible to facilitate such a replacement operation.

To that end, an assembly of the aforementioned type is provided, wherein each support member includes a foot rigidly attached to the support plate, a head to which the or each thermocouple duct is attached, and a detachable connection from the head to the foot.

Thus, the disassembly of the thermocouple ducts is made easier. It suffices to disassemble the connection to separate the head with the thermocouple ducts from the foot. The reassembly is also made easier.

This facilitates the replacement of one or several specific thermocouple ducts, as well as the replacement in a single operation of all of the thermocouple ducts. This last operation is performed by separating the heads of all of the support members from the corresponding feet, and at the same time discharging all of the thermocouple ducts with the heads that are attached to them.

The nuclear reactor can also have one or more of the features below, considered individually or according to any technically possible combinations:

the detachable connection is a screwed connection;

the head comprises a core and a cap removably connected to the core, the core and the cap delimiting a plurality of housings between them for receiving thermocouple ducts;

the detachable connection connects the core to the foot;

the housings are at least partially hollowed in the core, the cap including at least one arm closing the housings.

A method for assembling thermocouple ducts in a nuclear reactor is also provided, as defined above, the method comprising the following steps:
  assembling feet on the support plate;
  assembling end segments of the thermocouple ducts and heads of the support members in a subassembly;
  transferring the subassembly of a part above the support plate;
  attaching the heads to the feet of the support members.

The method may also have one or more of the features below, considered individually or according to any technically possible combinations.
  the transfer step includes:
    a sub-step for attaching the subassembly to a rigid transport structure;
    a sub-step for moving the transport structure with the subassembly above the support plate;
  the transport structure comprises a platform and members for attaching the heads to the platform;
  the transport structure comprises centering devices provided to cooperate with complementary centering devices mounted on the support plate.

A method for replacing existing thermocouple ducts in a nuclear reactor having the above features is also provided, the method comprising the following steps:
  disassembling the heads with respect to the feet;
  discharging the heads and end segments of the existing thermocouple ducts;
  assembling new end segments and new heads in a subassembly;
  transferring the subassembly of a part above the support plate;
  attaching new heads to the feet of the support members.

An assembly for implementing the assembly method above is also provided, the assembly comprising:
  a plurality of support members provided to keep the thermocouple ducts in position, each support member including a foot provided with an attachment to the support plate, a head provided with an attachment for at least one thermocouple duct, and a detachable connection of the head to the foot;
  a transport structure, comprising a platform and members for attaching the heads to the platform.

BRIEF SUMMARY OF THE DRAWINGS

The invention will be better understood upon reading the following description, provided solely as an example and done in reference to the appended drawings, in which.

DETAILED DESCRIPTION

Figure 1:
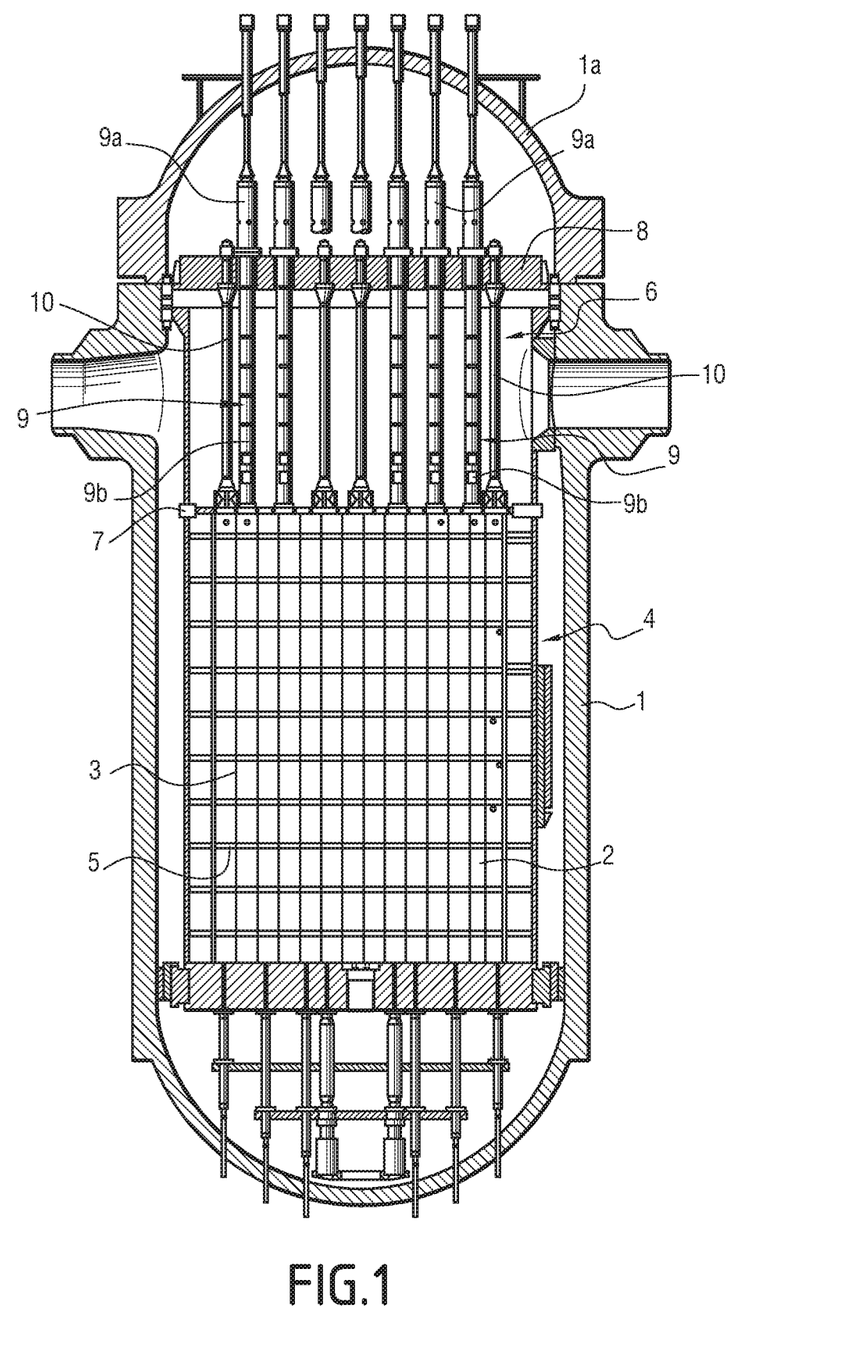
FIG. 1 is a schematic sectional view through a vertical plane of symmetry of the vessel of a pressurized water nuclear reactor.

The nuclear reactor illustrated in FIG. 1 comprises a vessel 1 and, inside the vessel 1, a core 2 made up of fuel assemblies 3 juxtaposed such that the longitudinal axis of the fuel assemblies is vertical. The core 2 of the reactor is positioned inside the lower inner equipment, designated by general reference 4, and which in particular includes the partition 5 of the core.

The nuclear reactor is typically a pressurized water reactor (PWR). Alternatively, the reactor is of another type.

The nuclear reactor also comprises upper inner equipment, designated by general reference 6, which rests on the assemblies of the core, via an upper core plate 7.

As shown in FIG. 1, the upper inner equipment 6 includes a support plate 8 for guide tubes, which will be referred to hereinafter as support plate 8. This support plate 8 extends parallel to the upper core plate 7 making up the lower part of the upper inner equipment 6 and that is made so as to attach the upper inner equipment 6 to the inside of the vessel 1.

The upper inner equipment 6 includes guide tubes, designated by general reference 9, which are made up, each above the support plate 8, of an upper part 9a with a circular section, and, between the support plate 8 of the upper inner equipment 6 and the upper core plate 7, a lower part 9b generally with a substantially square section with rounded corners. Each of the parts 9a and 9b constitutes a guide tube 9 for the upper inner equipment 6 allowing the vertical movement of a cluster for adjusting the reactivity in the core of the nuclear reactor, connected to a suspension and movement rod, the vertical movement of which is done by a mechanism, not shown, situated above the cover 1a of the vessel 1.

In addition to the lower parts 9b of the guide tubes 9, spacer columns 10 seeing to the maintenance and separation of the upper core plate 7 relative to the support plate 8 are placed between the support plate 8 of the upper inner equipment 6 and the upper core plate 7.

Figure 2:
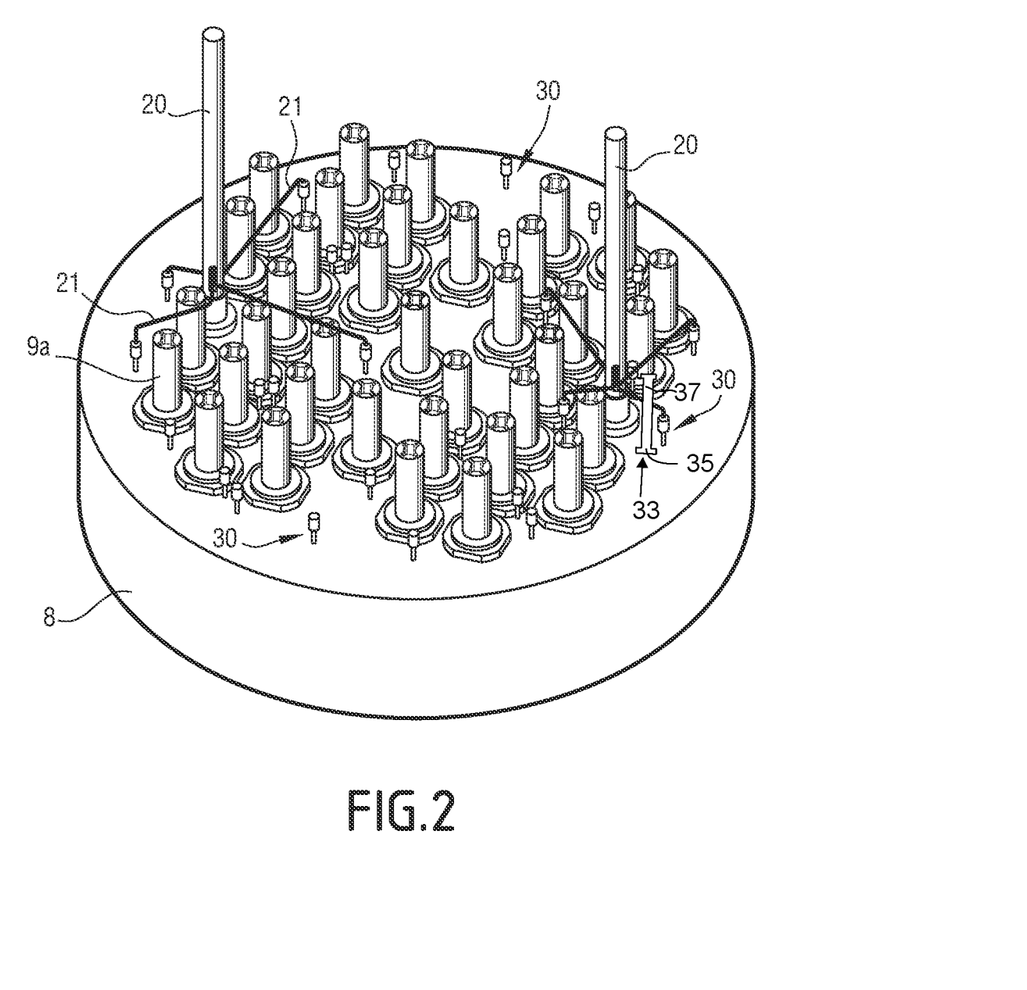
FIG. 2 is a schematic and partial perspective view of the upper inner equipment of a nuclear reactor.

FIG. 2 schematically shows a perspective view of the upper face of the support plate 8 that bears the upper parts 9a of the guide tubes 9 and in the example embodiment shown in this figure, two thermocouple columns 20 that extend parallel to the guide tubes 9, above the support plate 8. The flange making it possible to hang the support plate 8 from the vessel 1 has not been shown, but is visible in FIG. 6.

Traditionally, a set of thermocouple ducts 21 is positioned in each of the thermocouple columns 20. Typically, each duct 21 inwardly receives and guides a thermocouple making it possible to measure the temperature of the coolant at the outlet of a preselected assembly unit at the core of the nuclear reactor.

As shown in FIG. 2, several guide ducts 21 are positioned in a column 20 and leave said column through peripheral openings arranged above the foot of the thermocouple column 20 so as each to join a branch designated by general reference 30 and intended for the passage of a thermocouple through the support plate 8.

In this figure, a limited number of ducts 21 has been shown so as not to overload the figure. However, in reality, there are a large number of thermocouple ducts 21, which must nevertheless be kept in position relative to one another to avoid any interference between said ducts.

To that end, the nuclear reactor includes support members 33 (FIGS. 2 3 and 7) provided to keep the thermocouple ducts 21 in position, relative to one another and relative to the support plate 8.

Each support member 33 is rigidly attached to the support plate 8. At least one thermocouple duct 21 is attached to each support member. Typically, several thermocouple ducts 21 are attached to each support member. These support members are not shown in FIG. 2 for greater clarity.

Figure 7:
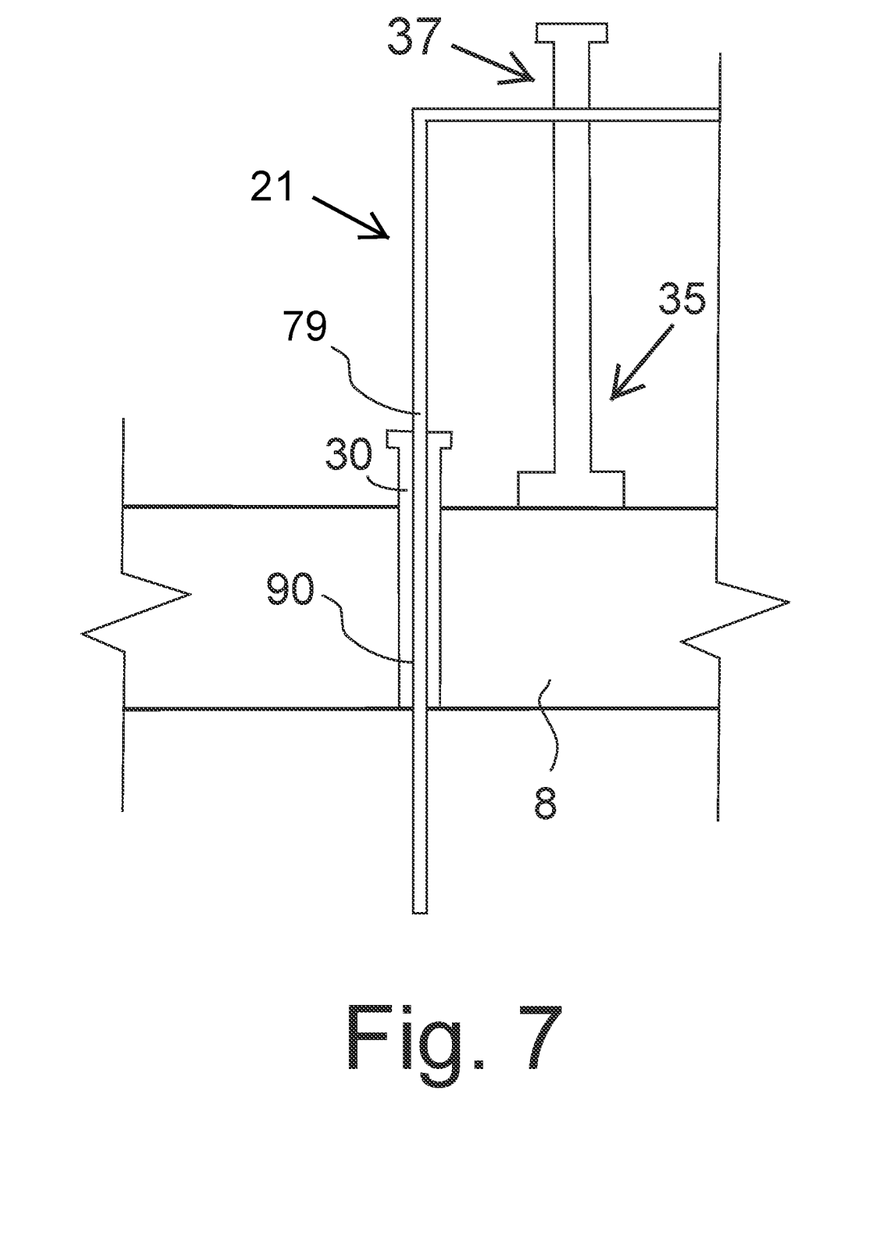
FIG. 7 schematically illustrates one of the support members attached to the support plate and holding a thermocouple duct that passes through the support plate.

According to the present disclosure, as shown in FIGS. 2 and 7, each support member 33 includes a foot 35 rigidly attached to the support plate 8, a head 37 to which the or each thermocouple duct 21 is attached, and a detachable connection 39 from the head 37 to the foot 35. FIG. 7 schematically shows an end segment 79 of a thermocouple duct 21 passing through the support plate 8 via a branch 30 through a dedicated orifice 90, with foot 35 of support member 33 attached to support plate 8 laterally offset from orifice 90 and end segment 79 of thermocouple duct 21 attached to head 37.

Figure 3:
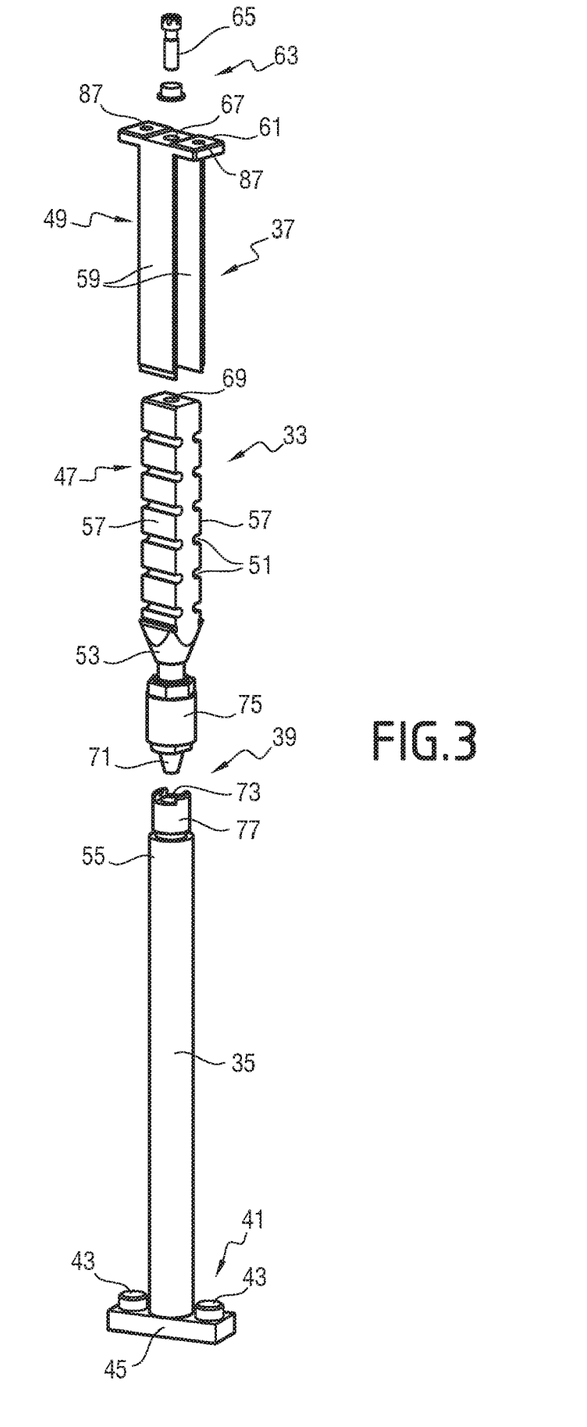
FIG. 3 is an exploded view of a support member of a nuclear reactor according to an embodiment of the invention.

The foot 35 has an elongated shape along the axis of the vessel 1, i.e., vertically. It comprises a detachable attachment 41 to the support plate 8. This attachment for example includes screws 43, securing a lower end 45 of the foot to the support plate.

The head 37 comprises a core 47 and a cap 49 removably connected to the core 47. The core 47 and the cap 49 delimit a plurality of housings 51 between them for receiving thermocouple ducts 21.

The core 47 has a vertically elongated shape, and is placed vertically in the extension of the foot 35.

The detachable connection 39 connects the core 47 to the foot 35. Typically, the detachable connection 39 connects a lower core 47 end 53 to an upper end 55 of the foot 35.

The housings 51 are at least partially hollowed in the core 47. To that end, the core 47 has two large vertical faces 57 opposite one another. The housings 51 are grooves, typically horizontal and parallel to one another, arranged in the large faces 57. They open out at their two opposite ends and extend over the entire width of the large faces 57.

Each groove has a section substantially conjugated to that of the thermocouple duct provided to be received therein.

The cap 49 includes at least one arm 59 closing the housings 51.

In the illustrated example, the housings 51 are arranged on the two large faces 57, the cap 49 therefore including two arms 59, each closing the housings arranged in one of the two large faces 57.

Each arm 59 has a surface pressed against the corresponding large faces 57, thus closing the housings 51.

The cap 49 further comprises an end-piece 61, to which the upper ends of each arm 59 are rigidly attached. The cap is therefore U-shaped, and is arranged straddling the core 47. The core 47 is inserted between the two arms 59.

Figure 4:
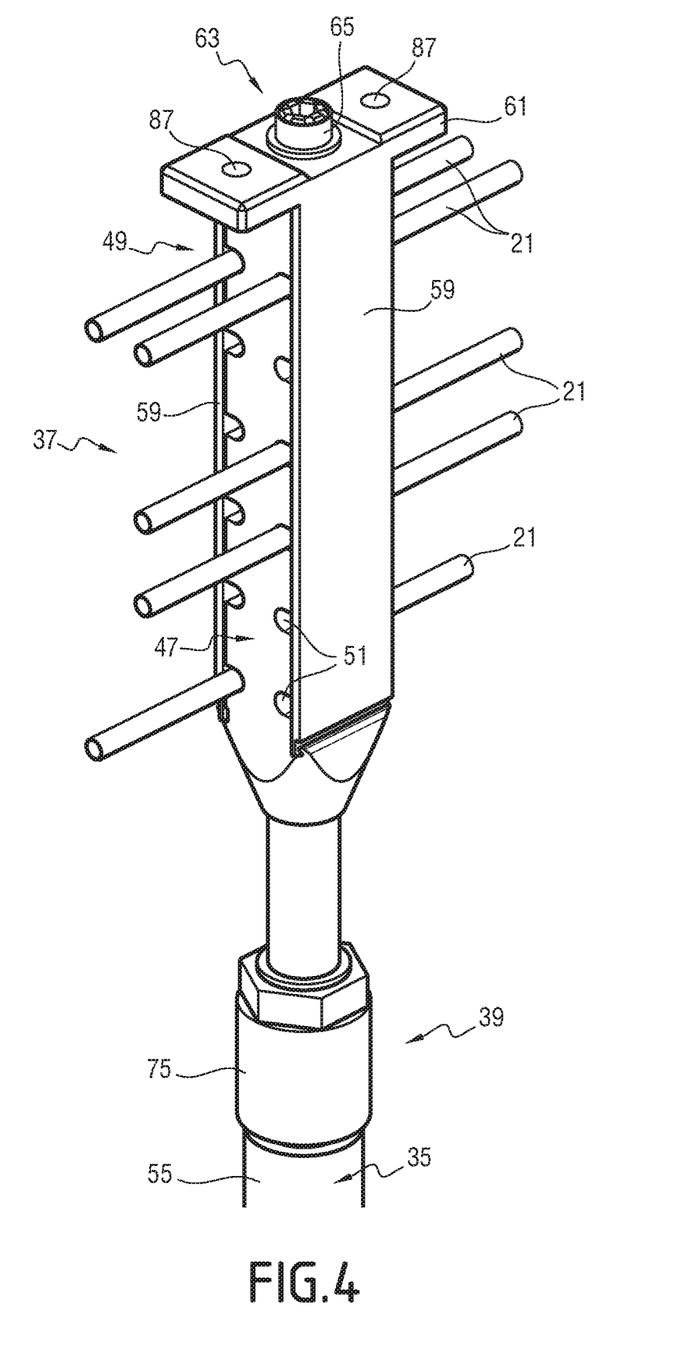
FIG. 4 is a perspective view of the upper part of the support member of FIG. 3, with thermocouple ducts attached to the head.

Each duct 21 is clamped between one of the arms 59 and the bottom of the notch 51 in which it is inserted.

The head 37 also includes an attachment 63 of the cap 49 to the core 47. For example, this attachment includes a screw 65, an orifice 67 passing through the end piece 61 and a tapped orifice 69 arranged at one end of the core 47. The screw 65 is engaged in the orifices 67 and 69. It has an outer thread cooperating with the inner tapping of the orifice 69.

Alternatively, the cap has only one arm.

The detachable connection 39 of the head 37 to the foot 35 is advantageously a screwed connection.

The lower end 53 of the core preferably ends with a cone 71 that engages in a blind hole with a complementary shape 73, arranged at the upper end 55 of the foot. A nut 75 is mounted captive around the lower end 53. The upper end 55 has an outer thread 77. The captive nut 75 is provided to screw on the outer thread 77, thus detachably securing the head 37 to the foot 35.

The method for assembling thermocouple ducts in the nuclear reactor described above will now be outlined in reference to FIGS. 5 and 6. The method applies to the initial assembly of the thermocouple ducts on the support plate. The case is considered here where all of the thermocouple ducts of the nuclear reactor are assembled in a single operation. The method is also applicable to the case where only some of the ducts are assembled in a single operation.

Figure 5:
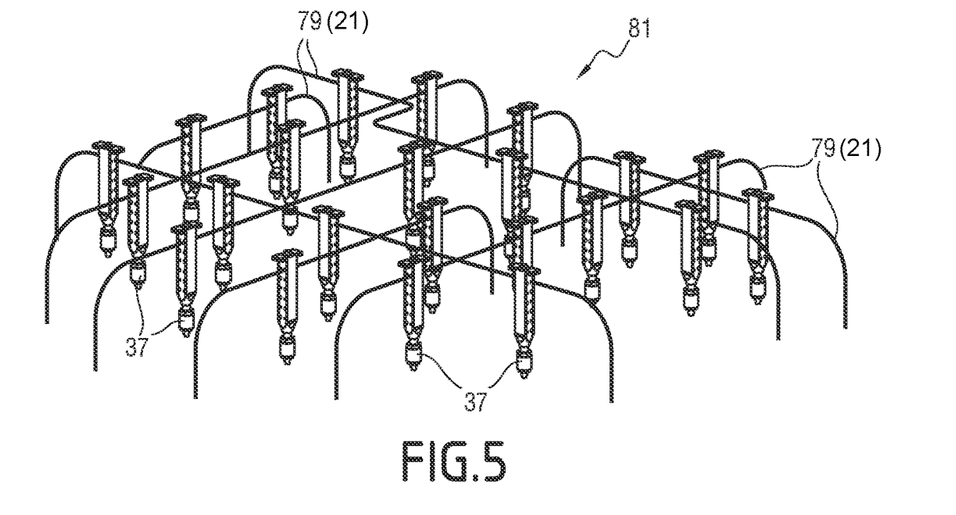
FIGS. 5 and 6 illustrate two steps of the method according to an embodiment of the invention, namely the assembly of the thermocouple ducts and the heads of the support members into a subassembly, and the transfer of the subassembly of a part above the support plate.

The method comprises the following steps:

assembling feet 35 on the support plate 8;

assembling end segments 79 of the thermocouple ducts 21 and heads 37 of the support members 33 in a subassembly 81, shown in FIG. 5;

transferring the subassembly 81 of a part above the support plate 8;

attaching the heads 37 to the feet 35 of the support members 33.

The assembly of the feet 35 is done by using the attachments 41. For example, the screws 43 are screwed into tapped orifices of the support plate 8.

Typically, the thermocouple ducts 21 each comprise a main part going up to the outlet of the column 20, the end segment 79 extending from the column 20 to the branch 30. The end segment 79 is detachably connected to the main part and to the branch 30, by detachable couplers.

In the subassembly 81, the end segments 79 and the heads 37 have exactly the position and the shape that they will ultimately occupy, once assembled on the support plate 8. This makes it possible to facilitate the assembly of the thermocouple ducts 21 greatly. The assembly of the subassembly 81 is done in the workshop, for example during a unit outage, in a zone with no radiation.

To assemble the subassembly 81, a model of the support plate 8, made to scale 1, is preferably used. This model in particular reproduces the thermocouple columns 20, the branches 30 and the feet 35. These are reproduced in real dimensions, and are positioned like in the nuclear reactor. The subassembly 81 is mounted provisionally on the model.

To assemble the thermocouple ducts 21 on the head 37, the ducts 21 are first placed at the bottom of the notches 51. Then, the cap 49 is placed around the core 47, such that the arm(s) close the notches 51. Lastly, the cap 49 is attached to the core 47, for example by screwing the screw 65 in the tapped orifice 69.

Figure 6:
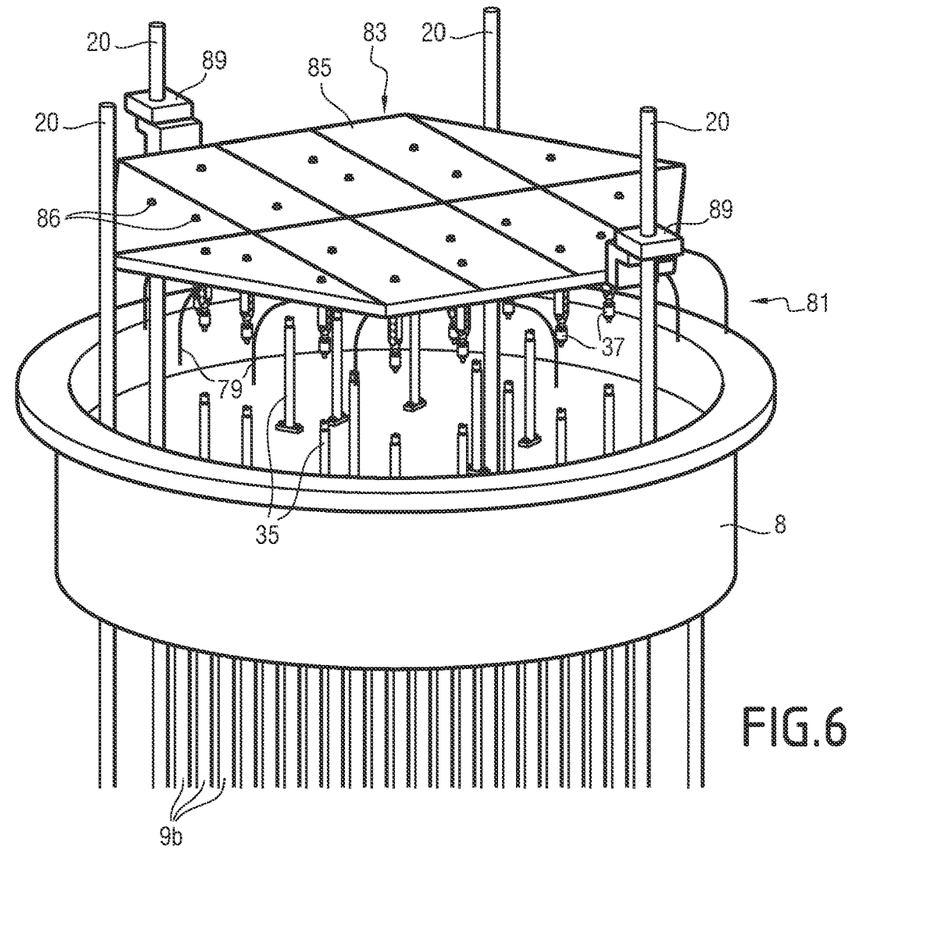

The transfer step advantageously includes:

a sub-step for attaching the subassembly 81 to a rigid transport structure 83;

a sub-step for moving the transport structure 83 with the subassembly 81 above the support plate 8.

As shown in FIG. 6, the transport structure 83 comprises a platform 85 and members 86 for attaching the heads 37 to the platform 85.

The platform 85 is for example generally plate-shaped.

The attachment members 86 typically comprise holes passing through the platform, and screws, not shown. The screws are engaged in the holes and are screwed in tapped orifices 87 arranged in the head 37. These tapped orifices 87 are provided for example in the cap 49.

The subassembly 81 is thus hung below the platform 85.

The attachment sub-step is carried out while the subassembly 81 is in place on the model.

The movement of the transport structure 83 with the subassembly 81 is done using any suitable means. The final placement above the support plate 8 is done for example with the polar bridge of the nuclear reactor.

The transport structure 83 comprises centering devices 89 provided to cooperate with complementary centering devices (not shown) mounted on the support plate 8. Thus, the transport structure 83 is guided to its nominal position by the centering devices and the complementary centering devices, which guarantees that the subassembly 81 is placed directly in its final position relative to the support plate 8. In this position, the heads 37 are located vertically immediately above the corresponding feet 35. The cones 71 are engaged in the blind holes 73.

The model is also equipped with complementary centering devices, arranged exactly like the complementary centering devices of the support plate 8.

The step for attaching the heads 37 to the feet 35 is done by actuating the connector 39, typically by screwing the nuts 75. This operation is done remotely or from the transport structure 83, which in this case is arranged to provide access to each of these connections. It for example to that end includes transparent removable hatches. The connections 39 are actuated by any appropriate means.

After tightening of the nuts 75, the screws securing the heads 37 to the platform 85 are removed.

Lastly, the end segments 79 are connected to the main segments of the thermocouple ducts 21 and to the branches 30 by the detachable couplers and the transport platform is discharged.

As indicated above, the invention also relates to a method for replacing existing thermocouple ducts in the nuclear reactor described above. This operation seeks to replace all or some of the old thermocouple ducts, during the lifetime of the nuclear reactor.

This method comprises the following steps:
disassembling the heads 37 with respect to the feet 35;
discharging the heads 37 and end segments 79 of the existing thermocouple ducts 21;
assembling new end segments 79 and new heads 37 in a subassembly 81;
transferring the subassembly 81 of a part above the support plate 8;
attaching the new heads 37 to the feet 35 of the support members 33.

The disassembly step is carried out remotely, by acting on the detachable connection 39.

The end segments 79 are next separated from the main parts of the thermocouple ducts 21 by acting on the corresponding couplers.

The discharging of the heads 37 and existing end segments 79 is done for example with the transport structure 83 described above. For example, the attachment members 86 are used to attach the heads 37 to the structure 83, the remaining end segments 79 secured to the heads 37.

The feet 35 remain in place on the support plate 8 and are reused to receive the new heads.

The steps for assembly the subassembly 81, transferring said subassembly 81 and attaching the new heads 37 are as described above.

The present disclosure also relates to a method for replacing an individual thermocouple duct in a nuclear reactor as described above. The thermocouple duct 21 is attached to the support plate 8 by one or several support members 33. As described above, the head 37 of the or each support member 33 includes a core 47 and a cap 49 connected removably to the core 47, the core 47 and the cap 49 delimiting a plurality of housings 51 between them. The duct 21 to be replaced is received in one of the housings 51 of the or each support member.

The method comprises the steps below:
separating the cap 49 relative to the core 47 of the or each support member 33;
discharging the end segment 79 from the duct 21;
replacing a new end segment 79 in the or each housing 51;
attaching the or each cap 49 on the or each corresponding core 47.

Before being discharged, the end segment 79 is separated from the main part of the duct 21 and the branch 30, by acting on the couplers. The discharging is done through any appropriate means.

The placement of the new end segment is typically done remotely. Before or after the attachment step, the new end segment 79 is connected to the main part of the duct 21 and the branch 30, by acting on the couplers provided to that end.

What is claimed is:

1. A nuclear reactor, comprising:
a vessel;
a plurality of nuclear fuel assemblies forming a reactor core arranged in the vessel;
a support plate arranged in the vessel above the reactor core;
a plurality of thermocouple ducts arranged in the vessel and passing through the support plate through dedicated orifices;
support members provided to keep the thermocouple ducts in position, each support member being rigidly attached to the support plate, each of the thermocouple ducts being attached to at least one of the support members, each thermocouple duct inwardly receiving and guiding a thermocouple;
each support member including a foot rigidly attached to the support plate, a head to which each thermocouple duct is attached, the head being detachably connected to the foot, the foot of each support member being arranged laterally offset with respect to the dedicated orifices; and
thermocouple columns extending above the support plate, a plurality of the thermocouple ducts being positioned in each thermocouple column and leaving the column through peripheral openings,
at least one of the thermocouple ducts being attached to at least two of the support members simultaneously, said at least two support members being distinct and being spaced apart from each other.

2. The reactor according to claim 1, wherein the head is detachably connected to the foot by a screwed connection.

3. The reactor according to claim 1, wherein the reactor comprises an upper core plate, the upper core plate being arranged between the support plate and the reactor core, the upper core plate and the support plate being maintained spaced apart from one another.

4. The reactor according to claim 1, wherein the head comprises a core and a cap removably connected to the core, the core and the cap delimiting a plurality of housings for receiving the thermocouple ducts, the housing being delimited between the core and the cap.

5. The reactor according to claim 4, wherein the core of the head is detachably connected to the foot.

6. The reactor according to claim 4, wherein the housings are delimited by grooves hollowed in the core, the grooves being configured to guide the thermocouple ducts horizontally through the head.

7. The reactor according to claim 4, wherein the housings are delimited by grooves hollowed in the core, the cap including at least one arm closing the groove.

8. The reactor according to claim 7, wherein the reactor comprises branches, each thermocouple duct being arranged so as to join one of the branches, each branch being aligned with one of the dedicated orifices to form a passage of the thermocouple duct through the support plate, each support member being arranged away from the branches.

9. The reactor according to claim 7, wherein the core has two vertical faces opposite one another, the grooves being arranged in at least one of the faces, the at least one arm having a surface pressed against the face in which the grooves are arranged.

10. The reactor according to claim 9, wherein the face, in which the grooves are arranged, is a plane.

11. The reactor according to claim 9, wherein the grooves are horizontal and parallel to one another.

12. A method for assembling thermocouple ducts in the nuclear reactor according to claim 1, the method comprising:
    assembling the foot of each of the support members on the support plate;
    assembling end segments of the thermocouple ducts and the head of each of the support members to form a subassembly;
    transferring the subassembly to a location above the support plate; and
    attaching the head of each of the support members to a respective foot of each of the support members.

13. The method according to claim 12, wherein the transferring of the subassembly includes:
    attaching the subassembly to a rigid transport structure; and
    moving the rigid transport structure with the subassembly to the location above the support plate.

14. The method according to claim 13, wherein the rigid transport structure comprises a platform and members for attaching the head of each of the support members to the platform.

15. An assembly for implementing the assembly method according to claim 12, the assembly comprising:
    the support members provided to keep the thermocouple ducts in position, the foot of each of the support members provided with a first attachment for attaching the foot to the support plate, the head of each of the support members provided with a second attachment for attaching the thermocouple ducts to the head, the head being detachably connected to the foot; and
    a transport structure, comprising a platform and members for attaching the head of each of the support members to the platform.

16. A method for replacing a first set of thermocouple ducts in the nuclear reactor according to claim 1, wherein the plurality of thermocouple ducts are the first set thermocouple ducts, and wherein the support members are a first set of support members, the method comprising:
    disassembling the head of each of the first set of support members from a respective foot of the first set of support members;
    discharging the head of each of the first set of support members and end segments of the first set of thermocouple ducts;
    assembling end segments of a second set of thermocouple ducts and a head of each of a second set of support members to form a subassembly;
    transferring the subassembly to a location above the support plate; and
    attaching the head of each of the second set of support members to a respective foot of the second set of support members.

17. A nuclear reactor, comprising:
    a vessel;
    a plurality of nuclear fuel assemblies forming a reactor core arranged in the vessel;
    a support plate arranged in the vessel above the reactor core;
    a plurality of thermocouple ducts arranged in the vessel and passing through the support plate through dedicated orifices;
    support members provided to keep the thermocouple ducts in position, each support member being rigidly attached to the support plate, at least one of the thermocouple ducts being attached to each support member, each thermocouple duct inwardly receiving and guiding a thermocouple;
    each support member including a foot rigidly attached to the support plate, a head to which the or each thermocouple duct is attached, the head being detachably connected to the foot, the foot of each support member being arranged laterally offset with respect to the dedicated orifices; and
    thermocouple columns extending above the support plate, a plurality of the thermocouple ducts being positioned in each thermocouple column and leaving the column through peripheral openings.
    wherein the head comprises a core and a cap removably connected to the core, the core and the cap delimiting a plurality of housings for receiving the thermocouple ducts, the housing being delimited between the core and the cap,
    wherein the housings are delimited by grooves hollowed in the core, the cap including at least one arm closing the groove,
    wherein the core has two vertical faces opposite one another, the grooves being arranged in at least one of the faces, the at least one arm having a surface pressed against the face in which the grooves are arranged.

18. The reactor according to claim 17, wherein the face, in which the grooves are arranged, is a plane.

19. The reactor according to claim 17, wherein the grooves are horizontal and parallel to one another.

* * * * *